Oct. 30, 1928.
N. TRBOJEVICH
1,689,565
METHOD OF AND MACHINE FOR GENERATING WORM GEARS AND THE LIKE
Filed Jan. 28, 1924          5 Sheets-Sheet 1
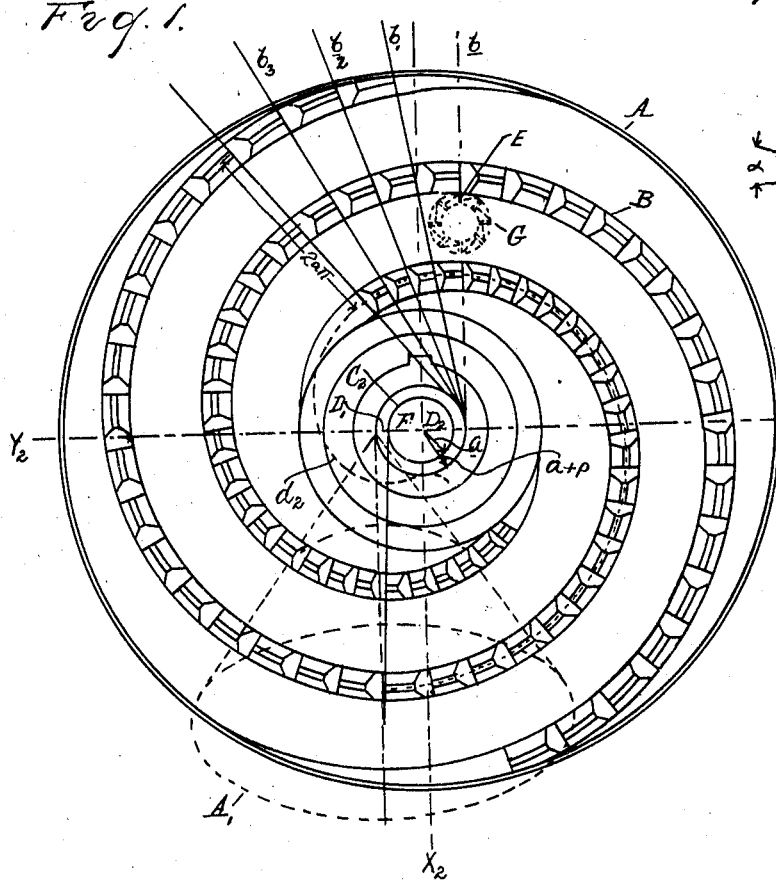
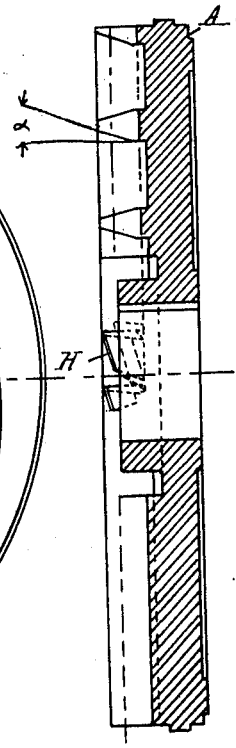
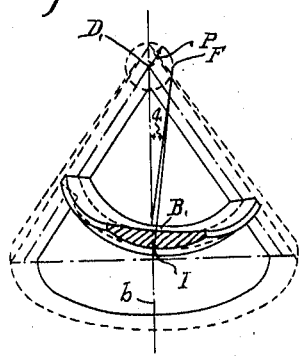
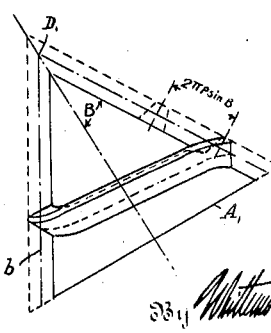
Inventor
Nikola Trbojevich Oct. 30, 1928.
N. TRBOJEVICH
1,689,565
METHOD OF AND MACHINE FOR GENERATING WORM GEARS AND THE LIKE
Filed Jan. 28, 1924    5 Sheets-Sheet 2
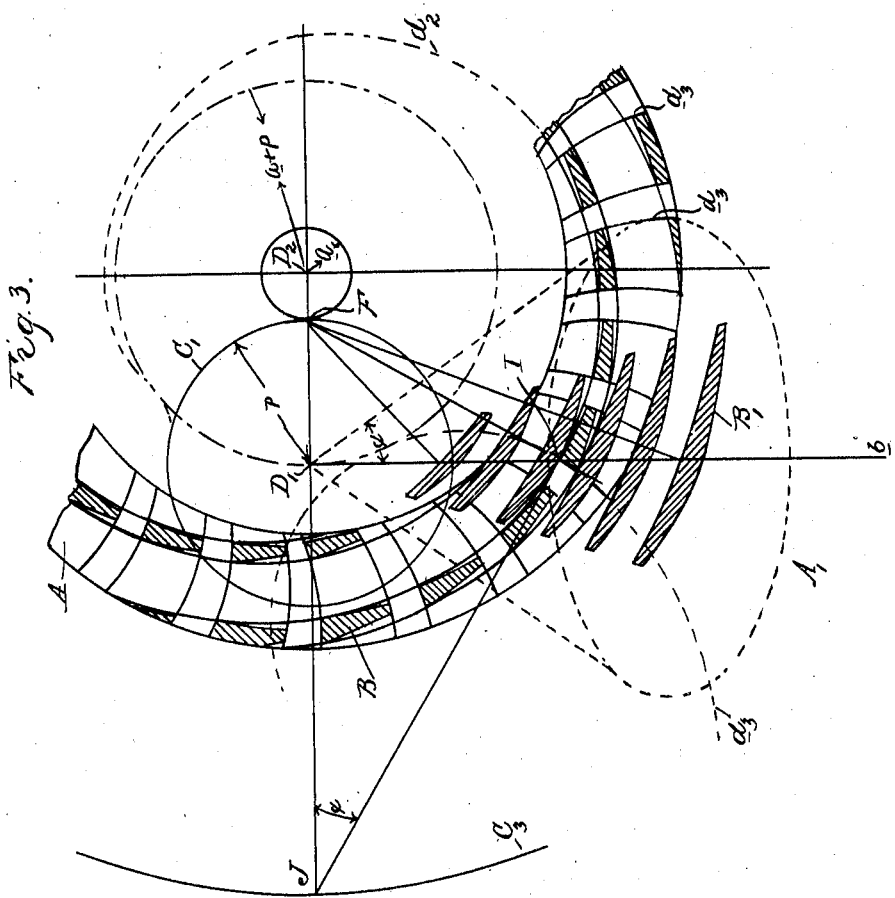
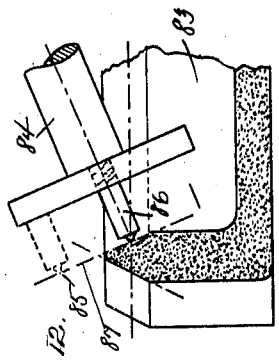
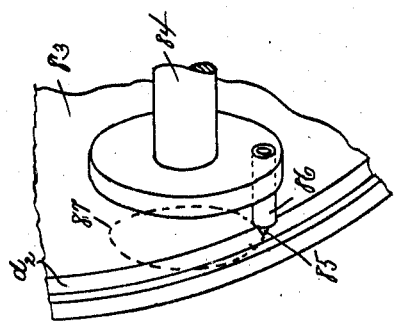
Inventor
Nikola Trbojevich
By Whittemore Hulbert Whittemore Belknap.
Attorneys Oct. 30, 1928.　　　　　　　　　　　　　　　　　1,689,565
N. TRBOJEVICH
METHOD OF AND MACHINE FOR GENERATING WORM GEARS AND THE LIKE
Filed Jan. 28, 1924　　　　5 Sheets-Sheet 5
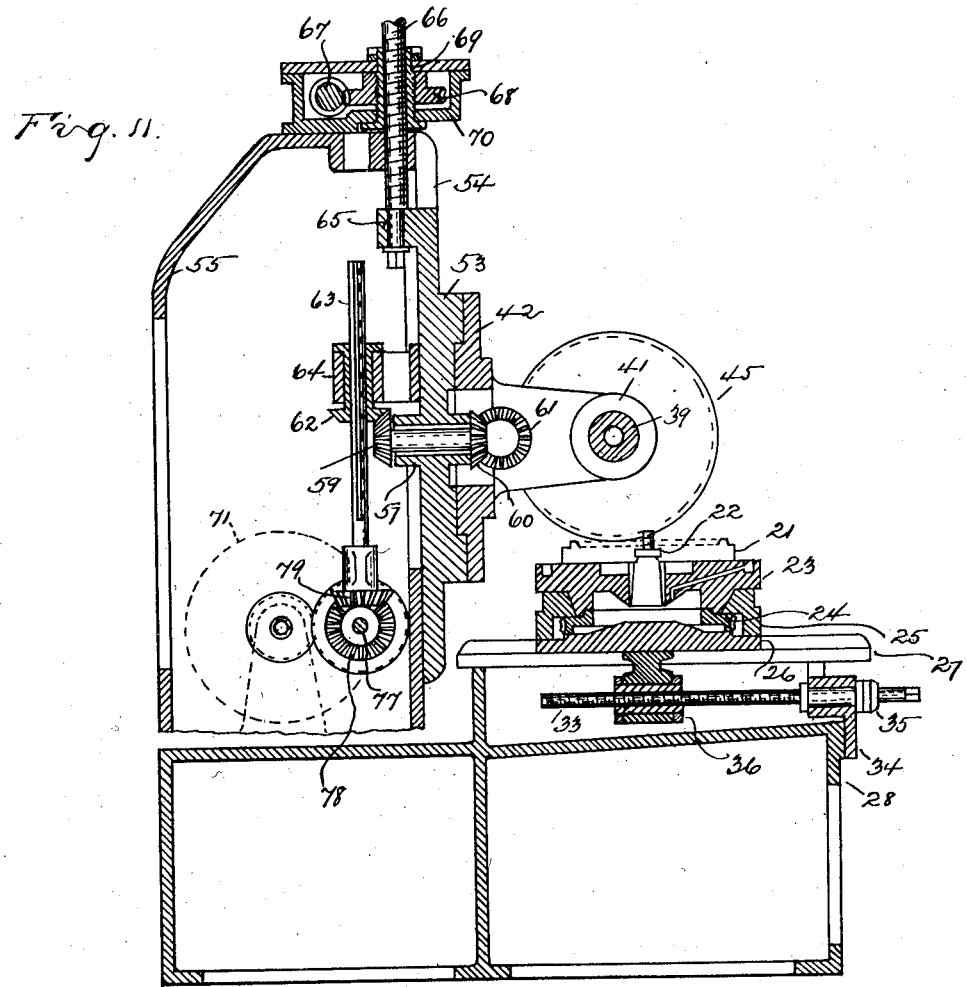

Patented Oct. 30, 1928.

1,689,565

UNITED STATES PATENT OFFICE.

NIKOLA TRBOJEVICH, OF DETROIT, MICHIGAN, ASSIGNOR TO GLEASON WORKS, OF ROCHESTER, NEW YORK, A CORPORATION OF NEW YORK.

METHOD OF AND MACHINE FOR GENERATING WORM GEARS AND THE LIKE.

Application filed January 28, 1924. Serial No. 689,130.

The invention relates to a novel modification of the hobbing process, by means of which gears and particularly conical and cylindrical worms, or screws particularly of constant lead, may be rapidly, accurately, and economically generated. The invention relates further to a process of forming conical and cylindrical worms which may be used as blanks for the production of conical and cylindrical hobs. While the process is theoretically correct only in the case of tapered worms, yet, by an appropriate selection of the dimensions of the cutting tool or hob, and by a suitable tangential arrangement of the blank with respect to said cutting tool, cylindrical or spur worms may also be produced within limits sufficiently close as to be satisfactory for most practical purposes. Owing to the very simple form of the cutting surfaces of the new hob, such hobs may be generated by means of a rotation and a translation at a constant ratio only, and the process is consequently applicable not only to milling of worms by the use of a hardened steel hob, but also to grinding of such worms in which latter case the hardened steel cutter is replaced by a grinder of a similar geometrical form, and means are provided for accurately dressing or trimming said grinder with a mechanically operated trimming device at regular or any other required intervals.

The tapered worms which may be generated by this process, have only lately become a machine element of considerable practical and commercial importance. This was due to my discovery of a new process of bevel gear hobbing (U. S. Pat. 1,465,150) in which a hob of the tapered worm shape is used for generating spiral bevel gears of the modified involute type, and also to my discovery of the new hyperboloidal worm gearing which form is fully described in a copending application Serial Number 684,862, filed January 7, 1924, and in which a tapered worm of constant lead runs in mesh with a hyperboloidal wheel having spiral teeth. Thus one of the objects of this invention is to provide means for accurately finishing the tapered worms, which constitute a vital element in my other two above mentioned inventions.

In the drawings:—

Fig. 1 is a plan view of a crown hob constructed according to one embodiment of my invention, and showing diagrammatically the position of the blank when in cutting engagement therewith;

Figure 2 is a transverse section thereof;

Figure 9:
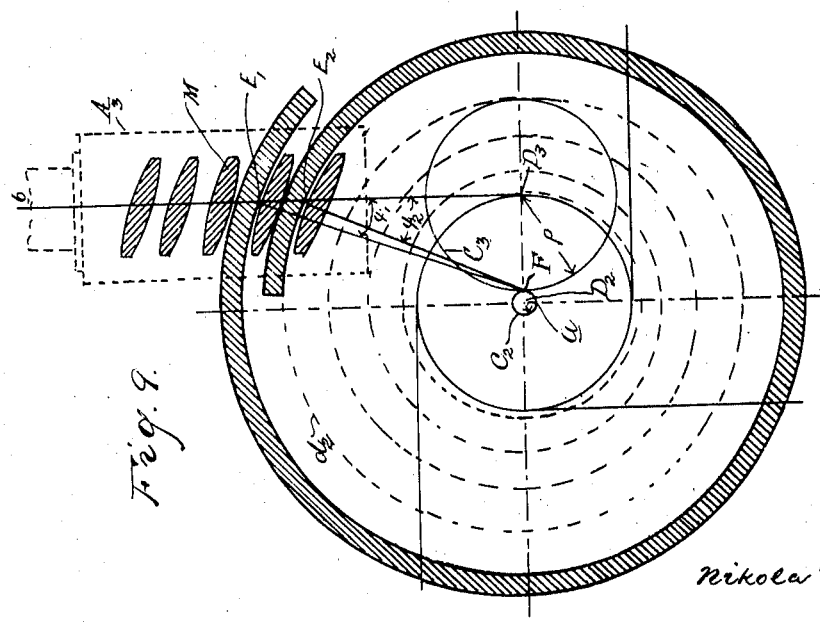
Figure 10:
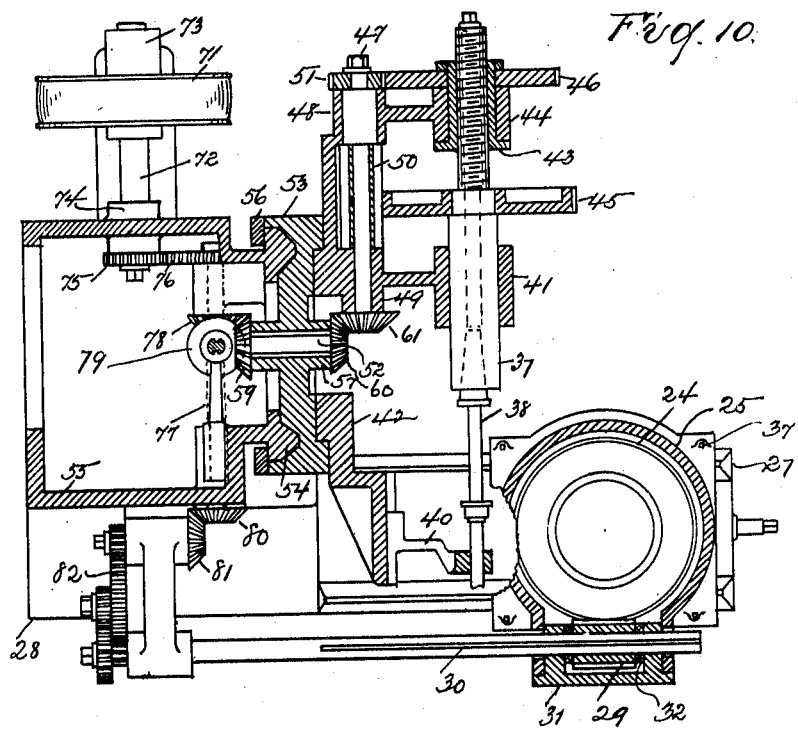

Figures 4, 5, 6, 7, and 8 are diagrams explanatory of the theory of the process;

Figures 3 and 9 are the pitch plane sections illustrating the generation of the tapered and spur worms respectively;

Figure 10 is the plan view of the hobbing machine suitable for generation of tapered and spur worms;

Figure 11 is the side elevation of the same machine;

Figures 12 to 15 are diagrams illustrating the method of trimming the contour of the new grinder hob.

In order to understand the theory of this process a reference might be made to my above mentioned Patent 1,465,150, in which a process of bevel gear hobbing was described, because the mechanical movement forming the foundation of the present process is nothing but a kinematical inversion of the movement used in generating spiral bevel gears in the former process.

It will be understood, however, that my invention is not restricted to the forms therein particularly described but is capable of modification within the scope of the invention and the limits of the appended claims.

According to that discovery a conical system of gearing may be built up by suitably selecting the longitudinal tooth curves and the transverse contours of teeth in each bevel gear belonging to that system so that the gears will have the following five fundamental properties, some of them heretofore unknown in bevel gearing, viz: (1) The gears are capable of meshing with a rolling contact when their axes lie in the same plane and their pitch cone apexes coincide, (2) they mesh with a sliding or screw engagement when their axes are disposed in two different planes, (3) mesh with a straight rack element of constant pitch, (4) mesh with a tapered screw of constant pitch, and (5) have a worm gear modification, the new hyperboloidal worm gear. It is of particular importance to note that all gears of that system are capable of meshing with a certain tapered worm, with a sliding engagement. Therefore, they all can be hobbed by a hob corresponding in its geometrical form to the said tapered worm. On the other hand, if hobs are made corresponding in form to any one of the spiral bevel or hyperboloidal gears of the new kind, the process may be reversed, and tapered worms of constant lead may be hobbed therewith. Such inversion is always possible theoretically and in view of my former disclosures, it may be said that generally, tapered worms may be hobbed by a hob, the geometrical contour of which corresponds to the spiral bevel gear first produced (including the crown gear and the hyperboloidal gear of that system) and the process of generation is exactly the same as formerly with the only difference that what was formerly a gear blank, now becomes a hob, and what was the hob, now becomes the gear blank.

When it comes to the practical application of that principle, however, it will be seen that of the innumerable forms of spiral conical hobs of the modified involute type having cone angles ranging from zero to 90 degrees, and of all the hyperboloidal forms having an angle of obliquity equal to the cone angle of the worm to be generated, there is one form of hob which may be considered as eminently practicable, that is, a form which may be produced with sufficient accuracy in standard machine tools by first generating the convolutions of the thread, next by gashing said thread crosswise, and then relieving, hardening and grinding the remaining teeth in order to form cutting edges, and that form is the crown wheel of the system.

Thus this invention deals specifically with modified involute hobs of the crown wheel type, with the method of calculating and manufacturing the same, and with the method of applying said hobs for the purpose of generation of worms, either single or multiple threaded, and either of the spur or the tapered type.

Figure 1 and Figure 2 show two views of a new hob of the modified involute crown wheel type. Said hob consists primarily of a circular flat disk A upon the plane face of which one or more convolutions of cutting teeth B are arranged in spirals $d_2$ of modified involute form. I have shown in my Patent Number 1,465,150 that these modified involute curves are defined by the equation:

$$x = (a+p) \cos \phi_2 + a\phi_2 \sin \phi_2$$
$$y = (a+p) \sin \phi_2 - a\phi_2 \cos \phi_2 \quad (1)$$

where $a$ is the radius of the base circle from which the modified involutes are derived, $p$, the amount of modification or offset and $\phi_2$, the parametric angle.

The pair of equations (1) refer to the $X_2 Y_2$ coordinate system shown in Figure 1, and determine a spiral which I termed a modified involute of a circle. A superficial analysis of said two equations will disclose the fact that besides the two variable coordinates $x$, $y$ and the variable parametric angle $\phi_2$ the equations also contain two constants $a$ and $p$, respectively designated as the base radius and the modification of the spiral. We shall now first show how the hobs represented in Figures 1 and 2 may be accurately manufactured in standard machine tools, and second that, such hobs are capable of correctly meshing with and generating tapered worms.

In manufacturing the new hobs a circular disk A is first turned and bored. Next, the blank is mounted in a universal milling machine and the convolutions B are milled by gearing up said milling machine to a lead equal to $2^a\pi$, the circumference of the base circe $C_2$ of the hob, and by placing a rotary end mill G in the line $b$, said line being offset from the center of the hob to an exact distance equal to $(a+p)$, the algebraic sum of the base radius and the modification of the hob. It is easily shown mathematically that if the hob is translated along the line $b$ (which line coincides with the rack element of the hob) and also rotated in a timed relation in the direction indicated by the arrow, any fixed point E in the line $b$ will describe a modified involute defined by the equations (1) upon the face of the hob. These modified involutes will be extended involutes if the value of $p$ is positive, that is, if the amount of offsetting $(a+p)$ is greater than the base radius of the hob, and they will be abridged involutes for all negative values of $p$. It is of interest to note that the modified involute may degenerate into a common involute for the value of $p=o$, and also into an Archimedean spiral for $a+p=o$. For the purposes of making the hob and worm described specifically in the above mentioned patent and application both $p$ and $a+p$ should be different from zero and finite.

After the required number of convolutions B have been milled and their sides have been beveled off to the required pressure angle $\alpha$ (Figure 2) so that the cross section of the hob thread along the line $b$ presents a rack of constant pitch, said convolutions are gashed crosswise by a number of equi-spaced flutes $b_1$ $b_2$ etc., and the remaining portions are relieved by means of a suitable relieving tool in a direction perpendicular to the plane of hob as shown at H Figure 2. In Figure 1 the flutes are all straight and are tangent to the $(a+p)$ circle, which arrangement is preferable providing the distance $p-$ is small in comparison with the diameter of the hob. However, if the distance $p$ is considerable the flutes are preferably curved in order that the cutting faces of teeth may be more nearly perpendicular to the thread spirals. In Figure 3 such an arrangement is diagramatically shown. There the hob spirals are extended involutes $d_2$ while the flutes are abridged involutes $d_3$ so selected that they are perpendicular to the hob spirals $d_2$ at the point I, said point lying substantially in the middle of the cutting face of the hob. Regarding the selection and general arrangement of flutes in the new hobs it may be stated that theoretically any kind of flutes may be employed, straight or spiral, equally or unequally spaced. In practice, however, the flutes are usually so selected that first they are equally spaced, second they intersect the convolutions at approximately right angles, third the hobs may be relieved mechanically, that is, by means of a relieving tool reciprocating in a direction perpendicular to the plane of hob at a constant ratio, fourth, the finished hobs may be accurately sharpened after they become dull through use, and fifth, the number of flutes must be a relative prime number with respect to the total number of convolutions or leads in the hob. Thus, it may be seen that in providing the new hobs with suitable flutes, preferably the same precautions are applied as in the case of common or spur hobs.

The dimensions of the abridged involutes $d_3$ forming the gashes of the crown hob of the extended involute type shown in Figure 3 may be determined from the right triangle FIJ. The modification $p'$ of said involute is equal to the distance $D_1J$, while the base radius $a' = D_2J = a + p + p'$. The lead of those spirals along the line $b$ is constant and equal to $2a'\pi$.

Figure 4:
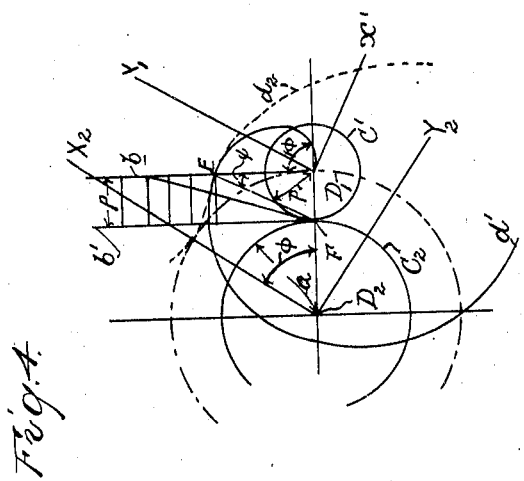

In Figure 4 the mathematical principle forming the foundation of this invention is illustrated. When the pitch cone of the tapered worm $A_1$ (Figures 1 and 3) is developed in a plane, the longitudinal tooth curves become spirals of constant lead, (Archimedean spirals) $d_1$ the mathematical equation of which is obviously:

$$D_1E = r = p\phi \quad (2)$$

where $p$ is the base radius or the polar subnormal of the worm.

It is now desired to construct a spiral that will correctly mesh with said Archimedean spiral at a constant ratio. The new spiral must be a modified involute as defined by the equations (1) and I have proved that fact mathematically in my former patents and publications. Said fact is also fairly obvious from purely kinematical considerations. Because when the line $b'$ to which the rack generator $b$ is rigidly attached is rolled without slipping on the circumference of the $C_1$ circle, the point E on the line $b$ will describe the Archimedean spiral $d_1$. However, when the parallelogram $b$ $b'$ is rolled on the circle $C_2$ the curve described by the point E is the extended involute $d_2$. Thus, the two spirals $d_1$ and $d_2$ are what might be termed odontically conjugate (being generated by the same lines rolling on two tangent circles) and their common normals in any position must pass through the pitch point of the system, while the locus of points of tangency (the line of action) is the line $b$. Therefore, when the two base circles $C_1$ and $C_2$ roll together like the pitch circles of two spur gears, the point E will be translated along the line $b$ with a constant velocity and the spiral $d_2$ will generate the spiral $d_1$ (or vice versa) in its full length. It is also evident that in order to insure the continuity of contact for any number of revolutions, the spirals $d_2$ must be equally spaced with respect to the center $D_2$ and said spacing (in arc measure of the base circle $C_2$) must be exactly equal to the pitch of the worm to be generated. Thus, in order to insure the continuous and correct meshing between the tapered worm $A_1$ and the crown hob A the following relations must necessarily exist:

$$p = \frac{n_1 p_0}{2\pi \sin \beta} \quad (3)$$

and $$a = \frac{n_2 p_0}{2\pi} \quad (4)$$

Where $n_1$ and $n_2$ are the number of threads or convolutions in the tapered worm and crown hob respectively, $\beta$ is the pitch cone angle of the worm and $p_0$ is the pitch of the rack generator $b$. Hence, the hob spiral is only partially determined from the dimensions of the worm to be generated and becomes fully determined only when the number of convolutions in hob $n_2$ is selected. In selecting the number $n_2$ it is advisable to select it so that it be relatively prime to $n_1$, in order to obtain the smoothest finish of the tooth surfaces obtainable with a given number of flutes or gashes.

Referring now again to the example illustrated in Figure 1 there the worm $A_1$ has a cone angle of 30 degrees and is single threaded, 6 diametral pitch. Therefore, from (3) the distance $p$ equals one sixth of an inch. The hob has six threads (of which four were milled away to facilitate the manufacture) and has a base radius $a$, calculated from the equation (4), equal to one half inch. The hob is provided with 35 flutes, said number being relatively prime to 6, and 6 again a prime with respect to one, the number of threads in the worm.

In Figure 3 the worm is multiple threaded, having a considerable thread angle F I $D_1 = \psi$. It is of interest to note the shaded areas which represent the cross sections of the two elements with their common tangent plane, or the pitch plane. The teeth B of the hob are relieved thereby forming suitable cutting edges along the flutes $d_3$, along which flutes the hob is also sharpened when it becomes dull. The crescent shaped cross sections $B_1$ of the worm thread are concave and comparatively flat on their sides facing the apex $D_1$, and are pronouncedly convex on the other side. This geometrical peculiarity makes this process possible in practice, as the contact between the two elements is thereby localized along the line $b$ (as required by the theory) and the mutilation of teeth is avoided as the hob threads may pass through the series of equispaced crescents without touching them at any other points except those lying in the line $b$.

Figures 5 and 6 show two views of a portion of thread of a tapered worm of constant lead, and the crescent shaped intersection $B_1$ of said thread with the pitch plane. The exact shape of that crescent may be determined experimentally, graphically, or by calculation, according as desired, and the knowledge of that form is useful in determining the slight amount of interference which may occur above and below the pitch line, and also on the pitch line itself if the hobbing machine for one reason or another is not set up to the exact theoretical figures.

Thus the process of generating tapered worms consists of the following steps: The hob spiral is first calculated from the equations (3) and (4) and a crown hob made up to conform to those figures. The worm to be hobbed is superposed upon the plane of the hob so that its pitch cone apex touches the circle $(a+p)$, its side $b$ is parallel to the plane of the hob, and said side $b$ is also perpendicular to the line $D_1 D_2$ as shown in Figure 1 and Figure 3. The two elements are then rotated in a timed relation and the worm is fed into the hob in a direction perpendicular to the plane of hob until the proper depth of teeth is reached. In this manner all worm threads are finished in their full lengths, and on their both sides, in a single operation, and without indexing.

Regarding the exact direction of the feed to be applied to the worm it may be mentioned that the relative feed movement is always in a plane perpendicular to the pitch plane of the hob and tangent to the $(a+p)$ circle, although it does not necessarily have to be a straight line, or perpendicular to the pitch plane. As it will be shown hereinafter in the description of the new hobbing machine designed for this particular class of work, a provision is made there to feed the worm also slightly lengthwise while it is being fed into the hob. The object of this modification is to avoid the repetition of the relative positions of the cutting edges of the hob with respect to the worm thread, and thereby avoid the generation of the so called flats or ridges upon the surface of the worm, which flats might be noticeable or objectionable if the hob had only a small number of flutes, or was not running true on its arbor.

Figure 8:
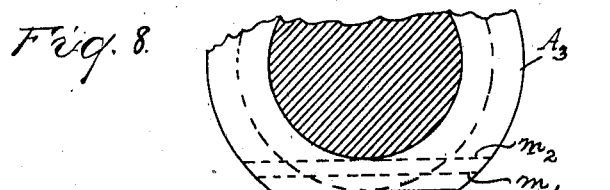
Figure 7:
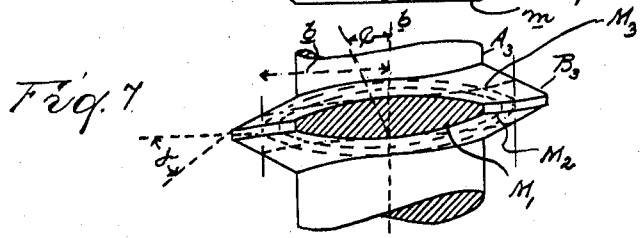

The method of generating cylindrical or spur worms will now be described. In Figure 7 and Figure 8, two views of a portion of such worm thread $B_3$ are shown and also the intersections $M$, $M_1$ and $M_2$ of said thread with a system of planes $m$, $m_1$ and $m_2$, said planes being parallel to the axis of the worm. As it can be seen from Figure 7, said cross-sections $M$ $M_1$ etc. are of an elliptical shape and are inclined to an angle $\psi$ with respect to the axis, said angle also being the thread angle of the worm. In this method of worm cutting it is necessary to know the approximate radii of curvature of the sections $M$, $M_1$ etc. so that a suitable hob may be selected that will possess a sufficiently large radius of thread curvature in order to avoid the contact and the consequent mutilation of worm surfaces at all points except those lying in the line of rack element $b$. The radius of curvature of the plane sections $M$ $M_1$ etc. may be determined as in the case of tapered worms either graphically or mathematically. The mathematical procedure of determining said radii is the following: First the equations of the acute helicoid $B_3$ are written down preferably in the Gaussian form, that is, three equations in $x$, $y$ and $z$ connected with two parameters. Then $y=b=$const. is substituted, where $b$ is the distance of the required plane $m$ from the axis of worm, and by this means one of the parameters as well as the $y$ coordinate are eliminated from the three equations, leaving only two equations in $x$ and $z$ connected with but one parameter. Having thus obtained the equation of the plane section $M$ its radius of curvature is easily obtained by two successive differentiations (see Townsend and Goodenough, Calculus P. 167). I have performed that calculation and have found that the radius of curvature $R$ is equal to:

$$R = \frac{b}{\tan \alpha \cos^3 \psi} \quad (5)$$

where $b$ is pitch radius, $\alpha$ the pressure angle and $\psi$ the helix angle of the worm, as indicated in Figure 7. Therefore, this method of worm cutting is practicable in all cases in which $R$ is not unduly large, that is, the worms must have a comparatively small diameter and helix angle, while the pressure angle should be considerable. It is seen that the ordinary U. S. standard screws fit into this scheme of manufacturing very well.

From the above explanation and Figure 9, the process of generating will at once be understood. The characteristic property of the crown hob of the modified (preferably the extended) involute type is that first it possesses an equispaced straight rack generator along the line $b$, and second, the tooth spirals $d_2$ intersect said rack element always in an acute angular relation. On the other hand, a worm also has the same property with two modifications viz, the rack generator lies in the axial or central plane, and the threads are intersected by said generator at a constant acute angle.

Suppose now that a crown hob of the extended involute type is constructed, such as shown in Fig. 9, having only one convolution of thread, a lead of spiral $E_1 E_2$ (measured along the offset line $b$) equal to the pitch $p_o$ of the worm to be generated, a diameter sufficiently large so that the radius of curvature of the hob spiral may be greater at all points than the corresponding radius of the worm thread, as defined by the equation 5, and finally a modification $p = F D_3$ so selected that the acute angle $F E_1 D_3$, or $F E_2 D_2$, or some other value lying between the two, is equal to the thread angle of the worm. In such a case, a spur worm $A_3$ may be superposed upon the hob along the line $b$ and when rotated in a proper timed relation together with the crown hob, the spiral $d_2$ of the hob will always remain in mesh with the helix of the worm, and will generate the same. This fact is also easily proved from the method of generating both the new crown hob and the worm. According to the definition, the new hob spiral $d_2$ is a product of a uniform translation of a point along the line $b$ and a uniform rotation about the center $D_2$. Similarly, the worm helix is a product of a uniform translation along the same line $b$ and a uniform rotation about the axis of the worm. Now the two rotations are so timed that the common rack generator $b$ always moves with the same linear velocity in both elements. It is seen, therefore, that the two elements will correctly mesh, providing the locus of mutual contact is limited to the plane section along the line $b$, and further, it is possible by this method to generate worms of considerable length, by simply feeding the worm into the hob lengthwise, along the line $b$. It will also be understood that the method must possess a slight theoretical error because the angle of the hob thread $F E_2 D_3$ at the beginning of the convolution is slightly greater than the angle $F E_1 D_3$ at the end of said convolution, resulting in a slight mutilation of worm thread along a certain portion of its circumference. This interference may however be practically avoided by making the teeth of the offending portion of the hob convolution slightly thinner on the pitch line from the rest of the teeth. Such corrections are often made in the art of gear cutting, and the suggestion therefore, will be understood.

*The generating machine.*

In Figures 10 and 11 a plan view and a side elevation of the proposed new hobbing machine are respectively shown. The new machine combines the advantages of two of the well known types of hobbing machines, the common or spur hobbing machine, and the worm gear hobbing machine of the tangential type. For this reason the new machine has a comparatively wide field of application as it can be used for all work of hobbing for which the former two types were used, and in addition, it is suitable for generating spur and tapered worms, for spiral bevel pinions and miters of the modified involute spiral type, and also for the crown and hyperboloidal wheels of the same type.

The general organization of the new machine hence, includes a hob and work spindle adjustable and rotatable in a timed relation in two perpendicular planes, means of swiveling one of the spindles (in our case the work spindle) in its plane about a pivot, and means for feeding the latter spindle along its axis during the process of generation. In Figure 11 the crown hob 21 is mounted upon a suitable hob arbor 22, said arbor keyed to the face plate 23, and said plate keyed upon the table worm gear 24. This unit rotates in a tapered bearing formed in the base ring 25, and a thrust bearing formed in the base plate 26, the plate being provided with two parallel ways engaging the corresponding smoothly finished ways 27 integral with the base casting 28. The hob is rotated through the worm gear 24 by means of the worm 29 (see Figure 10), the worm being slidably mounted upon the splined shaft 30 and held in a proper position relative to the gear by means of a bearing formed by an extension of the base ring 25, the bearing proper 39, and two thrust bearings 32. The whole tool head above described is movable and accurately adjustable in any longitudinal position by means of the hand screw 33, one end of which is housed in the bracket 34 clamped to the base casting 28 and provided with a graduated dial 35 while its threaded portion engages the nut 36 bolted to the base plate 26. The four screws 37 serve for clamping of said base plate to the base casting 28 after the necessary adjustment was accomplished.

The work is mounted upon the work arbor 38, which arbor is fitted in a tapered socket of the work spindle 39 and in a bearing formed in the tail stock 40. The work spindle 39 consists of two parts, the part nearest to the work being of comparatively large diameter, rotatable and also slidable in the bearing 41 integral with the work head base 42, while the part farthest from the work is a screw engaging rotary nut 43 housed in another bearing 44 of the base 42. The work spindle is driven by two spur gears 45 and 46, the first being directly keyed to the middle portion of the spindle while the other is keyed to the rotary nut 43. The base 42 houses still another parallel spindle 47 in two bearings 48 and 49, said spindle carrying the long slide pinion 50 and the change pinion 51 keyed thereto. The feed pinion and gear 51 and 46 are change gears and by a proper selection of their ratio with respect to the ratio of the main spindle drive formed by the gears 50 and 45, a suitable timed feed may be imparted to the spindle 39 longitudinally. If the two above mentioned ratios are exactly the same, there is no feed, as in that case the nut 43 rotates with the same angular velocity as the spindle 39, and the differential action upon which this feed movement depends, is absent.

The work head base 42 is fitted by means of a shallow circular bearing concentric with the drive shaft 52 into the plate 53 for the purpose of angular adjustment when cutting tapered worms. Said base may thus be tipped to any desired angle with respect to the plane of the crown hob 21, clamped in such position, and the tail stock 40 may be removed if it is found that it interferes with the hob. The plate 53 is slidable in a vertical plane along the two parallel ways 54 formed in the column casting 55, and is also supported in its vertical position by means of the two gib plates 56. The middle portion of said plate 53 is formed into a bearing 57 carrying the short shaft 52 to which the miters 59 and 60 are keyed on its two ends. The miter 60 engages the miter 61 keyed to the end of the shaft 47, while the miter 59 engages the sliding miter 62 driven from the vertical splined shaft 63, and held in position by a bracket 64, keyed to the plate 53. The upper portion of the plate 53 is formed into a boss 65 housing the end of the vertical feed screw 66. Said feed screw 66 is rotatable by means of the worm 67, the worm gear 68, the nut 69, all housed in the bowl 70, mounted upon the top of the column 55. Thus, by rotating the worm 67, the whole work head may be raised or lowered, and by means of a geared connection (not shown) said feed movement may also be accomplished by power, and in a timed relation with the rotation of the worm spindle 39.

The motive power is imparted to the pulley 71 mounted on the shaft 72, said shaft being housed in two bearings 73 and 74 and carrying the speed change gear 75 on its end inside of the column 55. Another speed change gear 76 is mounted on the adjacent and parallel shaft 77 supported in the column and also carrying two miter gears, the gear 78, which engages the miter 79 driving the vertical splined shaft 63 and the work, and the miter 80 engaging the miter 81, and through it the index change gears 82, the splined shaft 30, the worm 29, and ultimately the hob 21.

In the operation of the new machine a suitable hob is first selected, placed upon the face plate 23, and the cutter head is moved by means of the hand screw 33 toward the spindle 39 until the distance between the axes of the two spindles is exactly equal to $(a+p)$ in which position the cutter head is clamped. Next, the worm to be generated is placed on its arbor 38, the feed gears 51 and 46 are properly selected, the work support 42 is tipped to the angle of the worm (no tipping is necessary for spur worms), bolted to the vertical plate 53 in the required position, after which the elevating screw 66 is adjusted corresponding to the depth of the cut to be produced by the hob 21. The proper speed gears 75 and 76, and the index gears 82 are then selected and mounted, and the machine is ready for use.

Spur worms are generated by the tangential feed alone, in which case the vertical plate 53 may remain clamped to the column 55. For generating of tapered worms the tangential feed (through the change gears 51 and 46) may or may not be used, according as desired, and the chief feed movement is in the vertical direction, caused by the operation of the elevating screw 66. In the case when crown or hyperboloidal gears are generated, the position of the blank and the hob are reversed, that is, the blank is placed on the arbor 22 and the hob (always a tapered hob) on the arbor 38. The feed movement must then be perpendicular to the common tangent plane, which means vertical for crown gears, and oblique (a combination of the vertical and tangential feeds) for hyperboloidal gears.

Grinding of worms.

The grinding operation in this system of worm manufacturing in kinematically similar to the milling operation in all respects, except that first, the machine is run at a much higher rate of speed, and second, an auxiliary device is provided by means of which the abrasive wheel or hob may be accurately dressed to the proper contour, or trued with trimmer diamonds. Figure 12 and Figure 13 are two projections showing the cross section and a plan view for a portion of a grinder 3, a wheel made of some suitable abrasive material such as emery, and previously roughly molded into a shape resembling a crown hob of the modified involute type such as is shown in Figures 1, 2 and 9. It is desirable (for the purpose of facilitating the dressing of the wheel) that there be only one convolution of the continuous thread employed, in order that the trimmer diamond 84 of a considerable size may be used without the danger of interference with the adjacent threads of the wheel.

The method of dressing the wheel herein described is to my knowledge original with me, and is based upon a new principle of wheel dressing, which principle is fully described in a copending application for Patent Serial Number 647,670, filed June 25, 1923. According to that principle the grinding wheel 83 while being dressed is rotated very slowly, and the trimmer diamond 84 very rapidly. In this manner it is possible to produce helical and spiral convolutions upon the cutting surface of the wheel with a great precision, and in a reasonable length of time, as the wheel while being slowly rotated may also be translated along a certain fixed line (such as the line $b$ Figure 13) in a timed relation, and exact spirals, helixes and other mathematical curves and surfaces thus may be generated.

Figure 12 is the cross section of the arrangement shown in Figure 13, through the line $b$. The diamond 85 is held in the end of the stud 86 in the trimmer spindle 84 and is capable of rapidly describing a circle so selected that it approaches the true contour of the modified involute convolution $d_2$ as closely as possible. When the grinder 83 is slowly rotated and also translated along the line $b$, the diamond 85 will describe a series of circles 87 (shown in detail in Figure 14) and thereby dress the surface of the entire convolution.

A modification of the above dressing process is diagrammatically shown in Figure 15. There, the grinder 83 is not directly in contact with the diamond 85, as first an intermediate small cylindrical wheel 88, made of a harder substance than the main grinder 83, is dressed first by reciprocating the diamond 85 as shown by the arrows, and then the main wheel 83 is trimmed by means of said auxiliary or intermediate wheel 88. It is to be noted that the wheel 88 rotates very rapidly, and the wheel 83 very slowly, preferably in an opposite direction.

The method or process which forms the subject of this invention may be practised in various ways without departing from the intent of the invention or the scope of the following claims and this application is intended to cover any variations, uses, or adaptations, thereof, following, in general, the principles of the invention and including such departures from the present disclosure as come within known or customary practice in gear cutting and as may be applied to the essential features hereinbefore set forth and as fall within the limits of the appended claims.

Where the term gear or worm is used in the following claims it is to be understood that these terms are to be applied not only to elements produced for use as members of a pair of gears but also to elements to be used as blanks from which hobs may be made.

As illustrated and described, the invention may be applied to the production of worms in either a milling or a grinding operation and it is to be understood, therefore, that the terms "cutter", "cutting", "cutting portions", "cutting edges", etc. as employed in the appended claims, are intended to describe and apply to either a milling or a grinding tool and to either a milling or a grinding operation.

What I claim as my invention is:—

1. A method of generating worms of constant pitch and the like which consists in selecting a cutter in the form of a crown wheel of the modified involute type having a plurality of cutting teeth arranged in a spiral of the modified involute type, said teeth being of equal width in a plane perpendicular to the axis of the tool, in placing said cutter in tangential relation with the blank, and in rotating said blank and cutter in timed relation.

2. A method of generating worms of constant pitch and the like which consists in selecting a cutter in the form of a crown wheel of the modified involute type having a plurality of cutting teeth arranged in a spiral of the modified involute type, said teeth being of equal width in a plane perpendicular to the axis of the tool, in placing said cutter in tangential relation with the blank, in rotating said blank and cutter in timed relation, and imparting to one of said elements a feed movement in a direction transverse to the pitch plane of said cutter.

3. A method of generating worms of constant pitch and the like which consists in selecting a cutter in the form of a crown wheel of the modified involute type, having a plurality of cutting teeth arranged in a spiral of the modified involute type, the outermost points of which lie in a plane perpendicular to the axis of the tool and which are of equal width in a plane perpendicular to the axis of the tool, in placing said cutter in tangential relation with the blank, and in rotating the blank and cutter in timed relation.

4. A method of hobbing worms of constant pitch which consists of selecting a hob of the crown wheel type having the teeth formed in a plurality of spaced spirals, the curvature of said spirals being modified involute curves, whose base circle and modification are in predetermined relation with the pitch and the helix angle of the worm, in rotating said hob and worm in timed relation while maintaining the same in a position of mutual tangency, and imparting a relative feed movement to one of said elements with respect to the other.

5. A method of hobbing tapered worms of constant pitch which consists in selecting a crown hob, the thread convolutions of which are modified involutes having the base radius and the modification in predetermined relation to the pitch and the polar sub-normal of the worm, in placing said hob in tangential relation with a blank, in rotating said blank and hob in timed relation, and in imparting a relative feed movement to one of the elements with respect to the other, said movement being transverse to the pitch plane of the hob.

6. A method of generating worms of constant pitch in which a cutter is selected of a form of a modified involute crown wheel having a circumference of the base circle an exact multiple of the pitch of the worm to be generated, and a modification selected with reference to the helix angle of the worm, consisting in placing said cutter in a tangential relation with respect to the blank, said relation being that the line of tangency of the two elements is tangent to the modified base circle of the hob, in rotating the two elements in a timed relation and in imparting to the blank a relative movement of feed in a plane passing through the axis of the worm and perpendicular to the pitch plane of the cutter.

7. A method of generating worms of constant pitch in which a cutter is selected of a form of an extended involute crown wheel having a circumference of the base circle an exact multiple of the pitch of the worm to be generated and a positive modification selected with reference to the helix angle of the worm consisting in placing said cutter in a tangential relation with respect to the blank, said relation being that the line of tangency of the two elements is tangent to the $(a+p)$ circle, in rotating the two elements in a timed relation and in imparting to the blank a relative movement of feed in a plane passing through the axis of the worm and perpendicular to the pitch plane of the hob.

8. A method of generating tapered worms of constant pitch in which a cutter is selected of a form of a modified involute crown wheel having a circumference of the base circle an exact multiple of the pitch of the worm to be generated, and a modification equal in absolute value to the polar sub-normal of said worm, consisting in placing said cutter in tangential relation with respect to the blank, said relation being that the line of tangency of the two elements is tangent to the modified base circle of the hob, in rotating the two elements in a timed relation and in imparting to the blank a relative movement of feed in a plane passing through the axis of the worm and perpendicular to the pitch plane of the cutter.

9. A method of generating tapered worms of constant pitch in which a cutter is selected of a form of an extended involute crown wheel having a base circumference an exact multiple of the pitch of the worm to be generated, and a positive modification equal to the polar sub-normal of said worm, consisting in placing the cutter in a tangential relation with respect to the blank, in rotating the two elements in a timed relation and in imparting a relative movement of translation to the worm in a plane perpendicular to the plane of the cutter.

10. A method of hobbing worms of constant pitch which consists in selecting a crown hob, the thread convolutions of which are modified involutes of circle bearing a predetermined relation to the pitch and helix angle of the worm, in placing the blank in a tangent relation with respect to the plane of the hob, in rotating the two elements in a timed relation, and in imparting to the blank a relative movement of feed in a plane perpendicular to the pitch plane of the hob.

11. The method of producing gears which consists in positioning a tool having its cutting portions projecting from a plane face and arranged in a spiral of modified involute form and a gear blank in tangential relation with the line of tangency of the two elements tangent to the modified base circle of the tool, and rotating the tool and blank in timed relation.

12. The method of producing a worm which consists in rotating in engagement with a continuously rotating gear blank, a tool having a plurality of cutting teeth arranged thereon in a plurality of spiral convolutions and extending in the general direction of the axis of the tool and of equal width in a plane perpendicular to said axis, while imparting a relative feed movement between tool and blank.

13. The method of producing a worm which consists in rotating in engagement with a continuously rotating blank, a tool having a plurality of cutting teeth arranged thereon in a plurality of spiral convolutions, said teeth extending in the general direction of the axis of the tool and having their outermost points all lying in a plane perpendicular to the axis and being of equal width in a plane perpendicular to the axis.

14. The method of producing a worm which consists in selecting a tool having a plurality of cutting teeth arranged thereon in a plurality of spiral convolutions said teeth extending in the general direction of the axis of the tool and being of equal width in a plane perpendicular to said axis and having their outermost points lying in a plane perpendicular to said axis, positioning said tool in tangential relation with the blank with the axis of the blank angularly disposed to and offset from the axis of the tool, and rotating the tool in continuous engagement with the blank while rotating the blank continuously on its axis.

15. The method of producing gears which consists in rotating in engagement with a continuously rotating gear blank, a tool, having a plurality of finish cutting edges projecting from a plane face and arranged in a spiral of a plurality of convolutions, the pitch of which is uniform along a straight line offset from the axis of the tool and which intersects said line at an ever increasing acute angle, while imparting a relative feed movement between tool and blank.

16. The method of producing a worm which consists in selecting a tool having a plurality of cutting teeth arranged in a spiral and extending in the general direction of the axis of the tool and of equal width in a plane perpendicular to said axis, positioning said tool in tangential relation with the blank and rotating the tool and blank in continuous intermeshing timed relation.

17. The method of producing a worm which consists in selecting a tool having a plurality of cutting teeth arranged in a spiral and extending in the general direction of the axis of the tool, said teeth having their outermost points lying in a single plane perpendicular to said axis and being of equal width in a plane perpendicular to said axis, positioning said tool in tangential relation with the blank and rotating the tool and blank in continuous intermeshing timed relation.

18. The method of producing a worm which consists in selecting a tool having a plurality of cutting teeth arranged in a spiral and extending in the general direction of the axis of the tool and of equal width in a plane perpendicular to said axis positioning the tool in tangential relation with the blank with the axis of the blank angularly disposed to and offset from the axis of the tool, and rotating the tool and blank in continuous intermeshing timed relation.

19. The method of producing a worm which consists in selecting a tool having a plurality of cutting teeth arranged in a spiral and extending in the general direction of the axis of the tool, said teeth being of equal width in a plane perpendicular to said axis and having their outermost points lying in a plane perpendicular to said axis, in positioning said tool in tangential relation with the blank with the axis of the blank angularly disposed to and offset from the axis of the tool, and in rotating the tool and blank together in continuous intermeshing timed relation.

20. The method of producing gears which consists in rotating a tool having its cutting portions projecting from a plane surface and arranged in the form of a spiral in engagement with a rotating blank, while imparting a relative movement between tool and blank longitudinally of the blank axis.

21. The method of producing worms which consists in rotating a tool having its operating portions projecting from a plane face and arranged in a spiral, the pitch of which is equal to the lead of the worm to be produced, in timed relation with a rotating blank while imparting a relative movement between tool and blank longitudinally of the blank axis.

22. The method of producing worms which consists in rotating a tool, having its cutting portions projecting from a plane surface and arranged in a spiral, in engagement with a rotating blank while imparting a relative movement between tool and blank longitudinally of the blank axis.

23. The method of producing a worm which consists in rotating a tool, having a plurality of cutting teeth extending in the general direction of its axis and arranged to form an effective operating portion of rack section of constant pitch, said teeth being of equal width in a plane perpendicular to the axis of the tool, in continuous intermeshing engagement with a continuously rotating gear blank.

24. The method of cutting a worm conjugate to a crown gear which consists in selecting a tool having its cutting edges projecting from a plane face and arranged in conformity to the teeth of the crown gear and formed by gashing and relieving said teeth, and positioning said tool in tangential relation to the blank, and rotating the tool and blank in continuous intermeshing timed relation.

25. The method of producing worms which consists in rotating a tool having its cutting portions projecting from a plane face and arranged to form an effective operating portion of rack section in engagement with a rotating blank, while moving the blank relatively to the tool in a direction longitudinal of the blank axis.

26. The method of producing curved tooth gears the longitudinal curvature of whose teeth is derived from a base circle which consists in employing a tool having its cutting portions projecting from a plane face and arranged in a spiral, the longitudinal curvature of which is derived from a base circle, in positioning the tool and a gear blank so that in development their base circles are tangent and in rotating the tool and blank in timed relation.

27. The method of finish cutting longitudinally curved teeth gears, adapted to mesh interchangeably with a basic crown gear which consists in rotating a tool representing the crown gear in engagement with a continuously rotating blank while feeding the tool relatively to the blank transversely of a plane tangent to the pitch surface of the tool.

28. The method of finish cutting gears having longitudinally curved teeth and adapted to mesh interchangeably with a basic crown gear which consists in rotating a tool having its cutting portions projecting from a plane face and representing the crown gear, in engagement with a continuously rotating blank, while imparting a relative feeding movement between tool and blank transversely of a plane tangent to the pitch surface of the tool.

29. The method of producing gears from conical blanks which consists in selecting a tool having its cutting portions projecting from a plane face and arranged in a spiral, the normals to which at the pitch surface along a straight line offset from the axis of the tool intersect in a common point, positioning the tool and blank so that they are tangent to a common plane, with the point of intersection of the normals, the blank apex, and the center of the tool, all in the same straight line, and in rotating the tool and blank in timed relation.

30. The method of finish cutting gears from conical blanks which consists in selecting a tool having its cutting portions projecting from a plane face and arranged in a spiral, the normals to which at the pitch surface along a straight line lying in said surface intersect in a common point, positioning the tool and blank so that they are tangent to a common plane, with the point of intersection with the normals, the blank apex and the center of the tool, all in the same straight line, and in rotating the tool and blank in timed relation while imparting a relative feeding movement between tool and blank transversely of said tangent plane.

31. The method of producing gears which consists in positioning a tool having its cutting portions arranged in the form of a spiral and projecting from a plane face and a blank so that the normals to the cutting portions of the tool at the pitch surface and to the teeth to be produced on the blank along a straight contact line between tool and blank intersect in a single point, and in rotating the tool and blank in timed relation.

32. The method of producing a worm which consists in selecting a tool having a plurality of cutting teeth extending in the general direction of its axis and arranged to form an effective operating portion of rack section of constant pitch along a straight line offset from the axis of the tool, said teeth being of equal width in a plane perpendicular to said axis, positioning the tool in tangential relation with the blank, and rotating the tool and blank in continuous intermeshing timed relation.

33. The method of producing a worm which consists in selecting a tool having a plurality of cutting teeth extending in the general direction of its axis and arranged to form an effective operating portion of rack section of constant pitch along a straight line offset from the axis of the tool, said teeth being of equal width in a plane perpendicular to said axis and having their outermost points lying in a plane perpendicular to said axis, positioning the tool and blank in tangential relation, and rotating the tool and blank in continuous intermeshing timed relation.

34. The method of producing a worm which consists in selecting a tool having a plurality of cutting teeth extending in the general direction of its axis and arranged in the form of a spiral of uniform pitch along a straight line offset from said axis, said teeth being of equal width in a plane perpendicular to said axis, positioning the tool in tangential relation with the blank and rotating the tool and blank in continuous intermeshing timed relation.

35. The method of producing a worm which consists in selecting a tool having a plurality of cutting teeth extending in the general direction of its axis and arranged in a spiral which is of uniform pitch along a straight line offset from the axis of the tool, said teeth being of equal thickness in a plane perpendicular to said axis and having their outermost points lying in a single plane perpendicular to said axis, positioning said tool in tangential relation to the blank and rotating the tool and blank in continuous intermeshing timed relation.

36. The method of producing gears which consists in employing a tool having its cutting portions projecting from a plane face and arranged in the form of a spiral the perpendiculars to which at the pitch surface along a straight line offset from its axis intersect in a single point and in rotating the tool and blank in timed relation.

37. The method of producing gears which consists in rotating a tool, having its cutting portions arranged in the form of a spiral, the perpendiculars to which at the pitch surface along a straight line offset from its axis intersect in a single point and a gear blank in timed relation.

38. The method of producing gears which consists in employing a tool having its cutting portions arranged in the form of a spiral the perpendiculars to which at the pitch surface along a straight line offset from its axis intersect in a single point, in positioning the tool and a gear blank so that they contact along said straight line and in rotating the tool and blank in timed relation.

39. The method of producing gears which consists in positioning a tool, having its cutting portions projecting from a plane face and arranged in a spiral of constant pitch along a straight line offset from its axis, and a gear blank so that they contact along said line and in rotating the tool and blank in timed relation.

40. The method of producing a worm which consists in selecting a tool having a plurality of cutting teeth extending in the general direction of its axis and arranged in a spiral which is of constant pitch along a straight line offset from the axis of the tool, said teeth being of equal width in a plane perpendicular to said axis, positioning said tool in tangential relation with the blank with the axis of the blank projected into the common tangential plane coinciding with the offset line of constant pitch of the tool, and rotating the tool and blank in continuous intermeshing timed relation.

41. The method of finish cutting gears having teeth which are longitudinally spirals of the modified involute type which consists in positioning a tool having a plurality of cutting portions projecting from a plane face and arranged in spirals of the modified involute type, and a gear blank so that they are tangent to a common plane, and in rotating the tool and blank in timed relation while imparting a relative feed movement between tool and blank transversely of said tangent plane.

42. The method of producing a worm which consists in selecting a tool having a plurality of cutting teeth extending in the general direction of its axis and arranged in a spiral of the general involute type, said teeth being of equal width in a plane perpendicular to the axis of the tool, positioning the tool and blank in tangential relation, and rotating the tool and blank continuously in intermeshing timed relation.

43. In a gear cutting machine, a blank spindle, a tool spindle, means for adjusting said spindles relatively to each other to bring the tool and gear blank into cutting relation with their pitch surfaces tangent to a common plane and with the axis of one spindle extending transversely of said plane, means for rotating said spindles in timed relation and means for simultaneously imparting to one of said spindles a movement longitudinally of its axis.

44. In a gear cutting machine, a blank spindle, a tool spindle, and a tool supported thereon, means for adjusting said spindles relatively to each other to bring the tool and gear blank into cutting relation with their pitch surfaces tangent to a common plane, and with the axis of one spindle extending transversely of said plane, means for rotating said spindles in timed relation and means for feeding one of said spindles in a plane transverse to said tangent plane and in timed relation with the rotation of said blank spindle.

45. In a machine for producing worms, a blank spindle, a tool spindle, a rotating tool having its cutting portions projecting from a plane face mounted on said tool spindle, means for rotating the tool and blank spindles in timed relation and means for simultaneously imparting to one of said spindles a movement longitudinally of its axis.

46. In a machine for producing worms, a blank spindle, a tool spindle, a rotary tool, having a plurality of cutting teeth extending in the general direction of its axis and arranged in a spiral, said teeth being of equal width in a plane perpendicular to said axis, mounted on said tool spindle, means for rotating the blank and tool spindles in timed relation, and means for simultaneously imparting a relative feed movement between said spindles.

47. In a machine for producing worms, a blank spindle, a tool spindle, a rotary tool, having a plurality of cutting teeth extending in the general direction of its axis and arranged in a spiral, said teeth being of equal width in a plane perpendicular to said axis, mounted on said tool spindle, means for positioning the blank with its axis angularly disposed to and offset from the axis of the tool, means for rotating the tool and blank spindles in timed relation and means for simultaneously imparting a relative feed movement between said spindles.

48. In a machine for producing worms, a blank spindle, a tool spindle, a rotary tool, having a plurality of cutting teeth extending in the general direction of its axis and arranged in the form of a spiral which is of constant pitch along a straight line offset from the axis of the tool, said teeth being of equal width in a plane perpendicular to said axis, mounted on said tool spindle, means for rotating the tool and blank spindle in timed relation, and means for simultaneously imparting a relative feed movement between said spindles.

49. In a machine for producing worms, a blank spindle, a rotary tool, having a plurality of cutting teeth extending in the general direction of its axis and arranged in a spiral which is of constant pitch along a straight line offset from its axis, said teeth being of equal width in a plane perpendicular to said axis and having their outermost points lying in a plane perpendicular to said axis, means for positioning the tool and blank in tangential relation with the projected axis of the blank coinciding with the line of constant pitch of the tool, means for rotating the tool and blank in timed relation, and means for simultaneously imparting a relative feed movement between the tool and blank.

50. A method of producing worms which consists in selecting a tool having an operating portion extending in the general direction of its axis, the opposite side cutting edges of which are arranged on spirals which are equally spaced from each other throughout their length in a plane perpendicular to the axis of the tool and rotating said tool in continuous intermeshing timed relation with the blank.

51. The method of producing worms which consists in selecting a tool having an operating portion extending in the general direction of its axis, the opposite side cutting edges of which are curved longitudinally on spirals which are of constant pitch along a straight line offset from the axis of the tool and which are equally spaced from each other throughout their length in a plane perpendicular to the axis of the tool, and rotating said tool in continuous intermeshing timed relation with the blank.

In testimony whereof I affix my signature.

NIKOLA TRBOJEVICH.